United States Patent
Zhou et al.

(10) Patent No.: US 8,903,004 B2
(45) Date of Patent: Dec. 2, 2014

(54) PRECODING PROCESSING METHOD AND USER EQUIPMENT

(71) Applicant: Huawei Technologies Co., Ltd., Shenzhen, Guangdong (CN)

(72) Inventors: Yongxing Zhou, Shenzhen (CN); Qiang Wu, Shenzhen (CN); Chi Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/668,747

(22) Filed: Nov. 5, 2012

(65) Prior Publication Data
US 2013/0058425 A1    Mar. 7, 2013

Related U.S. Application Data

(63) Continuation of application No. PCT/CN2011/073501, filed on Apr. 29, 2011.

(30) Foreign Application Priority Data

May 4, 2010    (CN) .......................... 2010 1 0168659

(51) Int. Cl.
*H04B 7/02* (2006.01)
*H04L 1/02* (2006.01)
*H04B 7/10* (2006.01)
*H04B 7/04* (2006.01)
*H04B 7/06* (2006.01)

(52) U.S. Cl.
CPC ............... *H04B 7/0469* (2013.01); *H04B 7/10* (2013.01); *H04B 7/0639* (2013.01)
USPC ............................ 375/267; 375/219; 375/295

(58) Field of Classification Search
CPC ... H04B 7/0456; H04B 7/0639; H04B 7/0452
USPC .......................................... 375/267, 219, 295
See application file for complete search history.

(56) References Cited

U.S. PATENT DOCUMENTS

2008/0186212 A1    8/2008  Clerckx et al.
2009/0323863 A1*   12/2009 Lee et al. ...................... 375/308

(Continued)

FOREIGN PATENT DOCUMENTS

| CN | 101286824 A | 10/2008 |
|---|---|---|
| CN | 101594208 A | 12/2009 |
| CN | 101631004 A | 1/2010 |

OTHER PUBLICATIONS

International Search Report in corresponding International Patent Application No. PCT/CN2011/073501 (Jul. 21, 2011).
Written Opinion of the International Searching Authority in corresponding International Patent Application No. PCT/CN2011/073501 (Jul. 21, 2011).

(Continued)

*Primary Examiner* — Sam K Ahn
*Assistant Examiner* — Fabricio R Murillo Garcia
(74) *Attorney, Agent, or Firm* — Leydig, Voit & Mayer, Ltd.

(57) ABSTRACT

A precoding processing method and user equipment are disclosed. The precoding processing method includes: selecting a codebook vector for performing precoding processing for data among a codebook set of $N_t$ antennas, where the codebook set includes a first codebook vector $$\begin{bmatrix} A \\ B \end{bmatrix}$$

of a uniform linear array and a second codebook vector $$\begin{bmatrix} A \\ -B \end{bmatrix}$$

generated according to the first codebook vector, where A is a $(N_t/2) \times 1$ vector composed of a first half of elements of the first codebook vector, B is a $(N_t/2) \times 1$ vector composed of a last half of elements of the first codebook vector, and $N_t$ is a positive even number; and sending an index number of the codebook vector to a base station, whereupon the base station uses the codebook vector corresponding to the index number to perform precoding processing for the data to be transmitted by the antennas. Embodiments of the present invention make the codebook set compatible with two types of antenna configuration modes.

6 Claims, 4 Drawing Sheets

(56) References Cited

U.S. PATENT DOCUMENTS

2010/0034308 A1* 2/2010 Kim et al. .................. 375/267
2010/0208838 A1* 8/2010 Lee et al. .................. 375/267
2010/0260243 A1* 10/2010 Ihm et al. .................. 375/219
2012/0134434 A1 5/2012 Chen et al.

OTHER PUBLICATIONS

1st Office Action in corresponding Chinese Patent Application No. 201010168659.X (Mar. 5, 2013).

* cited by examiner

US 8,903,004 B2

PRECODING PROCESSING METHOD AND USER EQUIPMENT

CROSS-REFERENCE TO RELATED APPLICATIONS

This application is a continuation of International Patent Application No. PCT/CN2011/073501, filed on Apr. 29, 2011, which claims priority to Chinese Patent Application No. 201010168659.X, filed on May 4, 2010, both of which are hereby incorporated by reference in their entireties.

FIELD OF THE INVENTION

The present invention relates to the communication field, and in particular, to a precoding processing method and user equipment.

BACKGROUND OF THE INVENTION

Long Term Evolution-Advanced (Long Term Evolution-Advanced, LTE-A) is follow-up evolution of the LTE technology. In the LTE-A, a base station may use 8 antennas to transmit data. The 8 antennas may be configured in two modes. One mode is uniform linear array (Uniform Linear Array, ULA for short) antennas, and the other mode is dual-polarized antennas. FIG. 1 is a schematic structural diagram of an ULA antenna, and FIG. 2 is a schematic structural diagram of a dual-polarized antenna. As shown in FIG. 1 and FIG. 2, in the ULA antennas, 8 antennas have the same polarization direction, and the spacing between the 8 antennas is 0.5λ. In the dual-polarized antennas, the polarization direction of antennas 1-4 is different from the polarization direction of antennas 5-8.

In the prior art, the codebook structure of the ULA antenna is designed for the ULA antenna, and the codebook structure of the dual-polarized antenna is designed for the dual-polarized antenna, and the codebook structure is not compatible between the two types of antennas, which leads to resource redundancy.

SUMMARY OF THE INVENTION

Embodiments of the present invention provide a precoding processing method and user equipment to make the codebook set be compatible with two types of antenna configuration modes and reduce resource redundancy.

A precoding processing method provided in an embodiment of the present invention includes:

selecting a codebook vector for performing precoding processing for data among a codebook set of $N_t$ antennas, where the codebook set includes a first codebook vector $$\begin{bmatrix} A \\ B \end{bmatrix}$$

of a uniform linear array and a second codebook vector $$\begin{bmatrix} A \\ -B \end{bmatrix}$$

generated according to the first codebook vector, wherein, A is a $(N_t/2) \times 1$ vector composed of a first half of elements of the first codebook vector, B is a $(N_t/2) \times 1$ vector composed of a last half of elements of the first codebook vector, and $N_t$ is a positive even number; and sending an index number of the codebook vector to a base station, whereupon the base station uses the codebook vector corresponding to the index number to perform precoding processing for the data to be transmitted by the antennas.

A user equipment provided in an embodiment of the present invention includes:

a codebook selecting module, configured to select a codebook vector for performing precoding processing for data among a codebook set of $N_t$ antennas, where the codebook set includes a first codebook vector $$\begin{bmatrix} A \\ B \end{bmatrix}$$

of a uniform linear array and a second codebook vector $$\begin{bmatrix} A \\ -B \end{bmatrix}$$

generated according to the first codebook vector, and A is a $(N_t/2) \times 1$ vector composed of a first half of elements of the first codebook vector, B is a $(N_t/2) \times 1$ vector composed of a last half of elements of the first codebook vector, and N is a positive even number; and a sending module, configured to send an index number of the codebook vector selected by the codebook selecting module to a base station, whereupon the base station uses the codebook vector corresponding to the index number to perform precoding processing for the data to be transmitted by the antennas.

In the embodiments of the present invention, the user equipment may select a codebook vector in a codebook set that is compatible with both the ULA configuration mode and the dual polarization configuration mode, and send the index number corresponding to the codebook vector to the base station, and therefore, the base station can use the codebook vector to perform precoding processing for the data to be sent. Through the codebook set in the embodiments of the present invention, the largest possible number of codebooks are applicable to both the ULA antenna and the dual-polarized antennas, which provides high compatibility and avoids resource redundancy.

BRIEF DESCRIPTION OF THE DRAWINGS

To illustrate the technical solutions according to the embodiments of the present invention or in the prior art more clearly, accompanying drawings required for describing the embodiments or the prior art are introduced briefly below. Apparently, the accompanying drawings in the following description are merely some embodiments of the present invention, and persons of ordinary skill in the art may further obtain other drawings according to the accompanying drawings without creative efforts.

DETAILED DESCRIPTION OF THE EMBODIMENTS

To make the objectives, technical solutions, and advantages of the embodiments of the present invention clearer, the technical solutions of the embodiments in the present invention are hereinafter described thoroughly with reference to the accompanying drawings. Evidently, the described embodiments are merely some embodiments rather than all embodiments of the present invention. All other embodiments, which can be derived by persons of ordinary skill in the art from the embodiments of the present invention without any creative effort, shall fall within the protection scope of the present invention.

Figure 3:
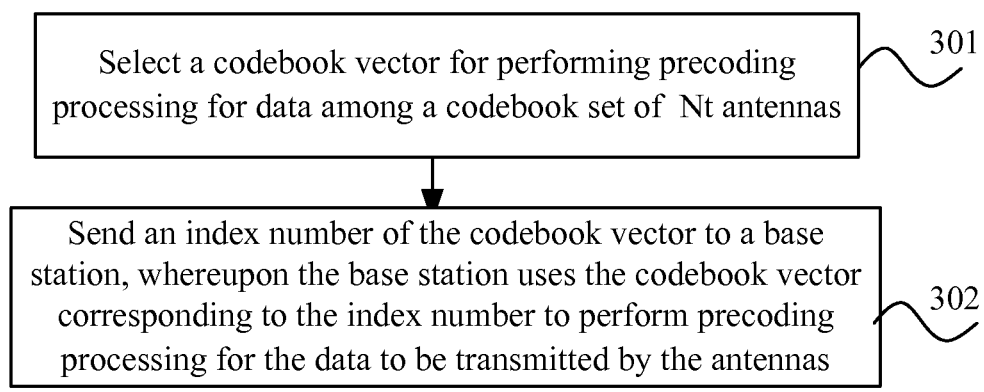
FIG. 3 is a flowchart of a precoding processing method according to an embodiment of the present invention.

FIG. 3 is a flowchart of a precoding processing method according to an embodiment of the present invention. As shown in FIG. 3, the method in this embodiment may include the following steps:

Step 301: Select a codebook vector for performing precoding processing for data among a codebook set of $N_t$ antennas.

In this embodiment, the codebook set includes a first codebook vector $$\begin{bmatrix} A \\ B \end{bmatrix}$$

of a ULA antenna and a second codebook vector $$\begin{bmatrix} A \\ -B \end{bmatrix}$$

generated according to the first codebook vector, where A is a $(N_t/2) \times 1$ vector composed of a first half of elements of the first codebook vector, and B is a $(N_t/2) \times 1$ vector composed of a last half of elements of the first codebook vector.

Specifically, the user equipment (User Equipment, UE for short) may select a codebook vector among the codebook set, where the codebook set may be used by the base station to perform precoding processing for the data to be transmitted. Specifically, the UE may select a codebook vector among the codebook set of $N_t$ antennas according to the configuration mode of the antenna. In this embodiment, the codebook set includes the first codebook vector $$\begin{bmatrix} A \\ B \end{bmatrix}$$

and the second codebook vector.

$$\begin{bmatrix} A \\ -B \end{bmatrix}.$$

The first codebook vector $$\begin{bmatrix} A \\ B \end{bmatrix}$$

is a codebook vector designed according to the ULA configuration mode, and the second codebook vector is generated according to the first codebook vector. For example, the codebook set may include 16 codebook vectors, 8 of which are the first codebook vectors $$\begin{bmatrix} A \\ B \end{bmatrix}.$$

Every first codebook vector $$\begin{bmatrix} A \\ B \end{bmatrix}$$

corresponds to a second codebook vector $$\begin{bmatrix} A \\ -B \end{bmatrix}.$$

Therefore, the 8 first codebook vectors $$\begin{bmatrix} A \\ B \end{bmatrix}$$

correspond to 8 second codebook vectors $$\begin{bmatrix} A \\ -B \end{bmatrix}.$$

For the first codebook vector $$\begin{bmatrix} A \\ B \end{bmatrix},$$

the codebook design may draw upon an existing discrete Fourier transformation (Discrete Fourier Transform, DFT for short) codebook structure. The calculation formula is as follows:

$$e_m^{(g)} = \frac{1}{\sqrt{M}} \left[ w_{0m}^{(g)} \ldots w_{(M-1)m}^{(g)} \right]^T \quad (1)$$

$$w_{nm}^{(g)} = \exp\left\{ j \frac{2\pi n}{M} \left( m + \frac{g}{G} \right) \right\}$$

In the formula above, M is the number of dimensions of DFT, m=0, 1 ... M−1, n=0, 1 ... M−1. For example, in the DFT corresponding to 8 antennas, M=8; in the DFT corresponding to 4 antennas, M=4. G is the number of groups of DFT, g=0, 1, ..., G−1. $e_m^{(g)}$ is a precoding vector in the codebook set, and $w_{nm}^{(g)}$ represents various elements in $e_m^{(g)}$. For example, if $N_t$=4, namely, if 4 transmitting antennas are introduced in the base station, a 4-dimensional DFT structure may be used to obtain four 4×1 precoding vectors. To generate a codebook set that includes 16 codebooks, G may be set to 4 so that 16 codebooks can be obtained.

Therefore, for the antennas that employ the ULA configuration mode, the UE may select any codebook vector among the codebook set, and the codebook set in this embodiment is compatible with the ULA configuration mode.

Further, the codebook set in this embodiment is compatible with the dual polarization configuration mode. Specifically, taking the structure of the dual-polarized antenna shown in FIG. 2 as an example, the total number of the dual-polarized antennas is 8, namely, $N_t$=8. The polarization mode of antennas 1-4 is different from the polarization mode of antennas 5-8. Because the 4 antennas of the same polarization mode are a uniform linear array, it is assumed that each group of dual-polarized antennas have the same directivity information, but a random phase relationship exists between two polarized antenna groups. Therefore, the codebook set of the dual-polarized antennas may be expressed as:

$$\begin{bmatrix} A \\ \alpha A \end{bmatrix}, \alpha \in (1, 1, j, -j) \quad (2)$$

In the expression above, A is a 4×1 vector selected in a 4-dimensional DFT codebook structure. α serves to adjust the phase relationship of two groups of polarized antennas.

Experiments prove that the codebook set created according to this embodiment can include the largest possible number of codebooks applicable to both the ULA antenna and the dual-polarized antennas.

Step 302: Send an index number of the codebook vector to a base station, whereupon the base station uses the codebook vector corresponding to the index number to perform precoding processing for the data to be transmitted by the antennas.

After selecting the codebook vector, the UE may send the index number corresponding to the codebook vector to the base station, whereupon the base station uses the codebook vector to perform precoding processing for the data to be transmitted by the antennas. It should be noted that this embodiment does not restrict the specific mode of using the codebook vector to perform precoding processing for the data to be transmitted, and those skilled in the art can select the mode as required.

In this embodiment, the user equipment may select a codebook vector in a codebook set that is compatible with both the ULA configuration mode and the dual polarization configuration mode, and send the index number corresponding to the codebook vector to the base station, and therefore, the base station can use the codebook vector to perform precoding processing for the data to be sent. Through the codebook set in the embodiments of the present invention, the largest possible number of codebooks are applicable to both the ULA antenna and the dual-polarized antennas, which provides high compatibility and avoids resource redundancy.

Figure 4:
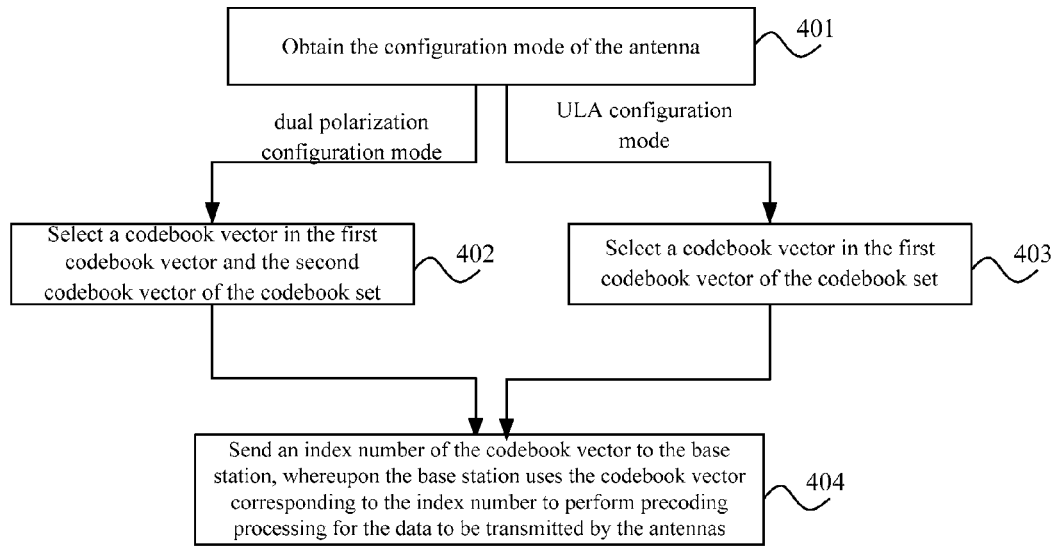
FIG. 4 is a flowchart of a precoding processing method according to another embodiment of the present invention.

FIG. 4 is a flowchart of a precoding processing method according to another embodiment of the present invention. As shown in FIG. 4, the method in this embodiment includes the following steps:

Step 401: Obtain an antenna configuration mode. For a dual polarization configuration mode, proceed to step 402; for a ULA configuration mode, proceed to step 403.

Step 402: Select a codebook vector in the first codebook vector and the second codebook vector of the codebook set, and proceed to step 404.

Step 403: Select a codebook vector in the first codebook vectors of the codebook set, and proceed to step 404.

Step 404: Send an index number of the codebook vector to a base station, whereupon the base station uses the codebook vector corresponding to the index number to perform precoding processing for the data to be transmitted by the antennas.

Specifically, on the basis of the embodiment shown in FIG. 3, this embodiment further defines the codebook set. More specifically, $N_t$=8, the spacing between the 8 antennas is a small spacing, and the codebook set in this embodiment includes K codebooks; wherein the 8×1 codebook vector $$\begin{bmatrix} A \\ B \end{bmatrix}$$

corresponding to K/2 codebooks in the K codebooks respectively is obtained by using an 8-dimensional discrete Fourier transformation codebook structure, and the number of the discrete Fourier transformation groups is K/(2Nt); the codebook vector of the other K/2 codebooks in the K codebooks is $$\begin{bmatrix} A \\ -B \end{bmatrix},$$

where A is a vector composed of the first 4 elements in the 8×1 codebook vector, and B is a vector composed of the last 4 elements in the 8×1 codebook vector.

Figure 1:
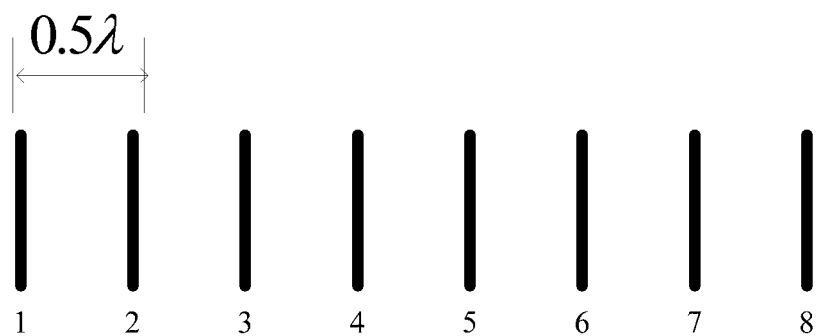
FIG. 1 is a schematic structural diagram of an ULA antenna.
Figure 2:
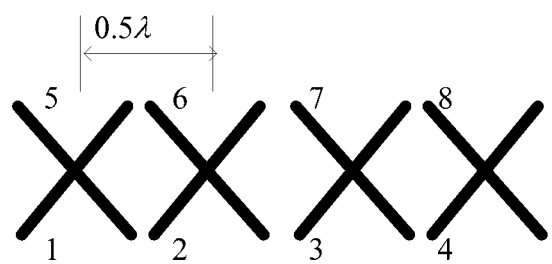
FIG. 2 is a schematic structural diagram of a dual-polarized antenna.

Specifically, the spacing between highly dependent antennas is small, for example, antennas shown in FIG. 1 and FIG. 2. This embodiment may design 5-bit 8-antenna codebooks whose rank is 1, namely, the number of codebooks is K=32. First, sixteen 8×1 codebook vectors $$\begin{bmatrix} A \\ B \end{bmatrix}$$

may be obtained according to formula (1). The 16 codebook vectors are a part of the 32 codebooks of 8 antennas. For each of the 16 codebook vectors, the first 4 elements are expressed as A, and the last 4 elements are expressed as B, and therefore, the 16 codebook vectors may be expressed as $$\begin{bmatrix} A \\ B \end{bmatrix},$$

and the other 16 codebook vectors are generated as $$\begin{bmatrix} A \\ -B \end{bmatrix}.$$

Analysis shows that the generated 32 codebooks correspond to the 8-antenna dual-polarized codebooks. Table 1 shows a mapping relationship between the generated 32 codebooks and the generated 8-antenna dual-polarized codebooks.

TABLE 1

| 8-antenna AB structure (8-dimensional DFT), G = 2, M = 8 | 4-antenna AA structure (4-dimensional DFT), G = 4, M = 4 | 4-antenna AjA structure (4-dimensional DFT), G = 4, M = 4 |
|---|---|---|
| g = 0 equivalent to | g = 0 and g = 2 | |
| g = 1 equivalent to | | g = 1 and g = 3 |

The codebook structure AAjAA of the dual-polarized antenna shown in formula (2) includes:

$$\begin{bmatrix} A \\ A \end{bmatrix}, \begin{bmatrix} A \\ -A \end{bmatrix}, \begin{bmatrix} A \\ jA \end{bmatrix}, \begin{bmatrix} A \\ -jA \end{bmatrix}$$

The AA structure shown in Table 1 is:

$$\begin{bmatrix} A \\ A \end{bmatrix}, \begin{bmatrix} A \\ -A \end{bmatrix}$$

The AjA structure shown in Table 1 is:

$$\begin{bmatrix} A \\ jA \end{bmatrix}, \begin{bmatrix} A \\ -jA \end{bmatrix}$$

The AB structure shown in Table 1 is:

$$\begin{bmatrix} A \\ B \end{bmatrix}, \begin{bmatrix} A \\ -B \end{bmatrix}$$

In Table 1, the 16 codebook vectors generated by g=0 in the 8-antenna AB structure (G=2, M=8) are the same as the 16 codebook vectors generated by g=0 and g=2 in the 4-antenna AA structure (G=4, M=4); and the 16 codebook vectors generated by g=1 in the 8-antenna AB structure (G=2, M=8) are the same as the 16 codebook vectors generated by g=1 and g=3 in the 4-antenna AjA structure (G=4, M=4).

Specifically, the 5-bit codebooks shown in Table 1 make up a codebook set that includes $2^5=32$ codebook vectors.

In the AAjAA structure, M=4, and g=0, 1, 2, 3.

In the AB structure, M=8, and g=0, 1.

(i) Compare the codebook vectors of (M=4, G=4, g=0 or g=2) in the AA structure with the codebook vectors of (M=8, G=2, g=0) in the AB structure.

If M=8 and g=0 in the AB structure, each element in the codebook vector is:

$$\exp\left\{j\frac{2\pi n}{8}(m)\right\};$$

If m=0, 2, 4, 6, let m=2k, (k is 0, 1, 2, 3), and each element of the upper half part A (n=0, 1, 2, 3) of the AB structure is:

$$\exp\left\{j\frac{2\pi n}{8}(2k)\right\} = \exp\left\{j\frac{2\pi nk}{4}\right\};$$

If M=4 and g=0 in the AA structure, each element in the codebook vector is:

$$\exp\left\{j\frac{2\pi n}{M}\left(m + \frac{0}{G}\right)\right\} = \exp\left\{j\frac{2\pi n}{4}(m)\right\}.$$

In this case, the 4 elements of the upper half part A of the AB structure are the same as the 4 elements of (M=4, g=0) of the AA structure.

The lower half part B (n=4, 5, 6, 7) of the codebook vector may be expressed as:

$$\exp\left\{j\frac{2\pi(n+4)}{8}(2k)\right\} = \exp\left\{j\frac{2\pi nk}{4} + 2k\pi\right\} = \exp\left\{j\frac{2\pi nk}{4}\right\}.$$

Therefore, herein the lower half part B of the codebook vector=the upper half part A.

Therefore, in this case, the AB structure and the AA structure have:

$$\begin{bmatrix} A = A \\ B = A \end{bmatrix}, \begin{bmatrix} A = A \\ -B = -A \end{bmatrix}.$$

When m is an odd number, namely, m=2k+1, each element in the upper half part A (n=0, 1, 2, 3) of the AB structure is:

$$\exp\left\{j\frac{2\pi n}{8}(2k+1)\right\} = \exp\left\{j\left(\frac{2\pi nk}{4} + \frac{2\pi n}{8}\right)\right\}.$$

If M=4, G=4 and g=2 in the 4-antenna AA structure, $$\exp\left\{j\frac{2\pi n}{4}\left(m + \frac{2}{4}\right)\right\} = \exp\left\{j\left(\frac{2\pi nm}{4} + \frac{2\pi n}{8}\right)\right\}.$$

Therefore, the vectors of the 4-antenna AA structure with (M=4, G=4, g=2) are the same as the upper half part A of the codebook vectors of the AB structure.

The lower half part B (n=4, 5, 6, 7) of the codebook vector may be expressed as:

$$\exp\left\{j\frac{2\pi(n+4)}{8}(2k+1)\right\} =$$
$$\exp\left\{j\frac{2\pi nk}{4} + 2k\pi + \frac{2\pi n}{8} + \pi\right\} = -\exp\left\{j\frac{2\pi nk}{4} + \frac{2\pi n}{9}\right\}.$$

In this case, B=−A.

Therefore, in this case, the mapping relationship between the AB structure and the AA structure is:

$$\begin{bmatrix} A=A \\ B=-A \end{bmatrix}, \begin{bmatrix} A=A \\ -B=A \end{bmatrix}.$$

(ii) Compare the codebook vectors of (M=4, g=1 or g=3 (G=4)) in the AjA structure with the codebook vectors of (M=8, g=1) in the AB structure.

If M=8 and g=1 in the AB structure, each element in the codebook vector is:

$$\exp\left\{j\frac{2\pi n}{8}\left(m+\frac{1}{2}\right)\right\};$$

If m=0, 2, 4, 6, let m=2k, (k is 0, 1, 2, 3), and each element of the upper half part A (n=0, 1, 2, 3) of the AB structure is:

$$\exp\left\{j\frac{2\pi n}{8}\left(2k+\frac{1}{2}\right)\right\} = \exp\left\{j\left(\frac{2\pi nk}{4} + \frac{2\pi n}{16}\right)\right\}.$$

If G=4, M=4 and g=1 in the AA structure, each element in the codebook vector is:

$$\exp\left\{j\frac{2\pi n}{4}\left(m+\frac{1}{4}\right)\right\} = \exp\left\{j\left(\frac{2\pi nm}{4} + \frac{2\pi n}{16}\right)\right\}.$$

In this case, the 4 elements of the upper half part A of the codebook vector in the AB structure are the same as the 4 elements of (M=4, g=0) in the AA structure.

The lower half part B (n=4, 5, 6, 7) of the codebook vector may be expressed as:

$$\exp\left\{j\frac{2\pi(n+4)}{8}\left(2k+\frac{1}{2}\right)\right\} =$$
$$\exp\left\{j\left(\frac{2\pi nk}{4} + \frac{2\pi n}{16} + \frac{\pi}{2}\right)\right\} = j\times\exp\left\{j\left(\frac{2\pi nk}{4} + \frac{2\pi n}{16}\right)\right\}.$$

Therefore, the lower half part of the codebook vector is B=jA.

Therefore, in this case, the mapping relationship between the AB structure and the AjA structure is:

$$\begin{bmatrix} A=A \\ B=jA \end{bmatrix}, \begin{bmatrix} A=A \\ -B=-jA \end{bmatrix}.$$

When m is an odd number, namely, m=2k+1, each element in the upper half part A (n=0, 1, 2, 3) of the AB structure is:

$$\exp\left\{j\frac{2\pi n}{8}\left(2k+1+\frac{1}{2}\right)\right\} = \exp\left\{j\left(\frac{2\pi nk}{4} + \frac{2\pi 3n}{16}\right)\right\}.$$

If M=4, G=4 and g=3 in the 4-antenna AjA structure, $$\exp\left\{j\frac{2\pi n}{4}\left(m+\frac{3}{4}\right)\right\} = \exp\left\{j\left(\frac{2\pi nm}{4} + \frac{2\pi 3n}{16}\right)\right\}.$$

Therefore, the 4 elements of the upper half part A of the codebook vector in the AB structure are the same as the 4 elements of (M=4, g=0) of the AjA structure.

The lower half part B (n=4, 5, 6, 7) of the codebook vector may be expressed as:

$$\exp\left\{j\frac{2\pi(n+4)}{8}\left(2k+1+\frac{1}{2}\right)\right\} = \exp\left\{j\left(\frac{2\pi nk}{4} + \frac{2\pi 3n}{16} + \pi + \frac{\pi}{2}\right)\right\}$$
$$= -j\exp\left\{j\left(\frac{2\pi nk}{4} + \frac{2\pi 3n}{16}\right)\right\}.$$

In this case, the lower half part of the codebook vector of the AB structure is B=−jA.

Therefore, in this case, the mapping relationship between the AB structure and the AA structure is:

$$\begin{bmatrix} A=A \\ B=-jA \end{bmatrix}, \begin{bmatrix} A=A \\ -B=jA \end{bmatrix}.$$

Therefore, in this embodiment, the codebook vectors of the AB structure are a result of extracting 16 codebook vectors from (g=0, g=2) of the AA structure and extracting 16 codebook vectors from (g=1, g=3) of the AjA structure. In the codebook set of 32 codebook vectors generated according to such a structure, all codebook vectors are applicable to dual polarization configuration. Moreover, the codebook set is obtained based on the 8-antenna DFT codebook structure. Therefore, the 16 codebook vectors of the codebook set are applicable to ULA configuration. Therefore, the codebook set in this embodiment is compatible with both the antennas configured in a ULA mode and the antennas configured in a dual polarization mode.

Therefore, in this embodiment, if the UE knows that the antennas are configured in a ULA mode, the UE may choose to obtain codebook vectors from a first codebook set, where the first codebook set is composed of 16 codebook vectors that are obtained based on an 8-antenna DFT codebook structure, whereupon the base station can use the codebook vectors to perform precoding processing; if the UE knows that the antennas are dual-polarized antennas, the UE may select codebook vectors among all 32 codebook vectors, namely, among the first codebook set and the second codebook set, whereupon the base station can use the codebook vectors to perform precoding processing.

It should be noted that in this embodiment, the UE does not necessarily know the configuration mode of the antennas, but rather makes blind selection in the codebook set of this embodiment to obtain the first codebook.

In this embodiment, the UE may select codebook vectors among the codebook set compatible with both the ULA configuration mode and the dual polarization configuration mode according to the configuration mode of the antenna. If the antenna is configured in a ULA mode, the UE may select codebook vectors among the first codebook set of the codebook set; if the antenna is configured in a dual polarization mode, the UE may select codebook vectors among the second codebook set of the codebook set. In this way, the index numbers corresponding to the codebook vectors may be sent to the base station so that the base station can use the codebook vectors corresponding to the index numbers to perform procoding processing for the data to be sent. Through the codebook set in the embodiments of the present invention, the largest possible number of codebook vectors are applicable to both the ULA antenna and the dual-polarized antennas, which provides high compatibility and avoids resource redundancy.

Figure 5:
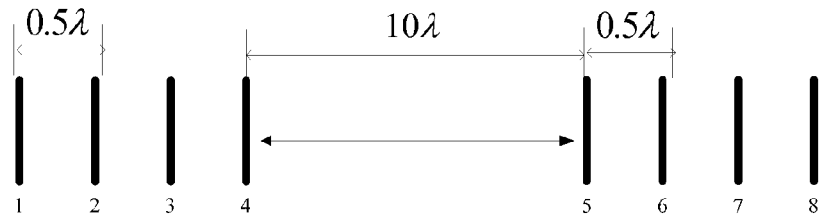
FIG. 5 is another schematic structural diagram of a ULA antenna applied to the present invention.
Figure 6:
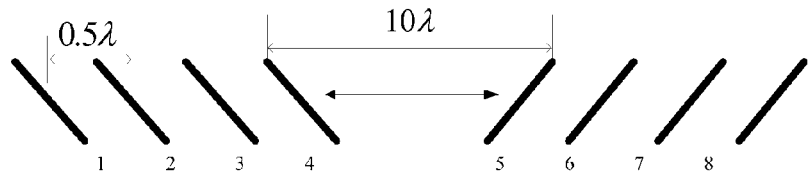
FIG. 6 is a schematic structural diagram of a dual-polarized antenna applied to the present invention.

FIG. 5 is another schematic structural diagram of an ULA antenna, and FIG. 6 is another schematic structural diagram of a dual-polarized antenna. As shown in FIG. 5 and FIG. 6, the ULA antennas and the dual-polarized antennas are divided into two groups, with antennas 1-4 forming one group and antennas 5-8 forming another group. The spacing between the four antennas in antennas 1-4 or antennas 5-8 is a small spacing such as 0.5λ; and the spacing between antennas 1-4 and antennas 5-8 is a large spacing such as 10λ. In such an antenna layout, the transmitting directions of the two groups of antennas are different, or in other words, the 4-dimensional DFT vectors they used are different. For example, the DFT vector selected by antennas 1-4 is A, but the DFT vector selected by antennas 5-8 is B, and a constant is still required between the two groups of antennas to indicate the direction relationship between the two groups of antennas.

Therefore, in the precoding processing method according to another embodiment of the present invention, the codebook set may include K codebooks, and the K codebooks include the first codebook vector $$\begin{bmatrix} A \\ B \end{bmatrix}$$

and the second codebook vector $$\begin{bmatrix} A \\ -B \end{bmatrix},$$

where A is a 4×1 vector obtained by using a 4-dimensional DFT codebook structure and corresponding to one group of antennas, and B is a 4×1 vector obtained by using a 4-dimensional DFT codebook structure and corresponding to another group of antennas. In this embodiment, the codebook may be expressed as $$\begin{bmatrix} A \\ \alpha B \end{bmatrix},$$

$\alpha \in (1, -1)$.

This embodiment does not need to differentiate the antenna configuration modes, and the UE can select codebook vectors in the codebook set no matter whether the antenna configuration mode is the ULA configuration mode shown in FIG. 5 or the dual polarization configuration mode shown in FIG. 6, and therefore, the base station can use the codebook vectors to perform precoding processing for the data to be sent. Therefore, the codebook set in this embodiment is compatible with both ULA antennas and dual-polarized antennas. The compatibility is high, and the resource redundancy is avoided.

Figure 7:
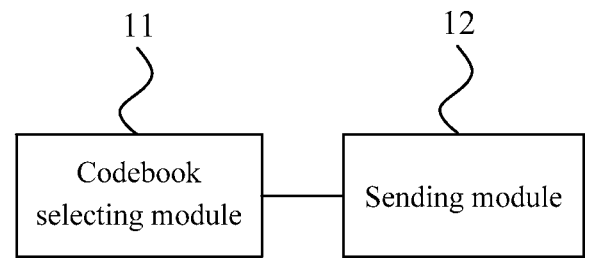
FIG. 7 is a schematic structural diagram of user equipment according to an embodiment of the present invention.

FIG. 7 is a schematic structural diagram of user equipment according to an embodiment of the present invention. As shown in FIG. 7, the UE in this embodiment may include a codebook selecting module 11 and a sending module 12. The codebook selecting module 11 is configured to select a codebook vector for performing precoding processing for data among a codebook set of $N_t$ antennas, where the codebook set includes a first codebook vector $$\begin{bmatrix} A \\ B \end{bmatrix}$$

of a uniform linear array and a second codebook vector $$\begin{bmatrix} A \\ -B \end{bmatrix}$$

generated according to the first codebook vector, and A is a $(N_t/2) \times 1$ vector composed of a first half of elements of the first codebook vector, B is a $(N_t/2) \times 1$ vector composed of a last half of elements of the first codebook vector, and ($N_t$ is a positive even number, for example, 2 multiplied by itself a positive number of times; and the sending module 12 is configured to send an index number of the codebook vector selected by the codebook selecting module 11 to a base station, whereupon the base station uses the codebook vector corresponding to the index number to perform precoding processing for the data to be transmitted by the antennas.

The UE in this embodiment may be used to implement the method in the method embodiment shown in FIG. 3, and the implementation principles are similar and will not be repeated here any further.

In this embodiment, the user equipment may select a codebook vector in a codebook set that is compatible with both the ULA configuration mode and the dual polarization configuration mode, and send the index number corresponding to the codebook vector to the base station, and therefore, the base station can use the codebook vector to perform precoding processing for the data to be sent. Through the codebook set in the embodiments of the present invention, the largest possible number of codebooks are applicable to both the ULA antenna and the dual-polarized antennas, which provides high compatibility and avoids resource redundancy.

Figure 8:
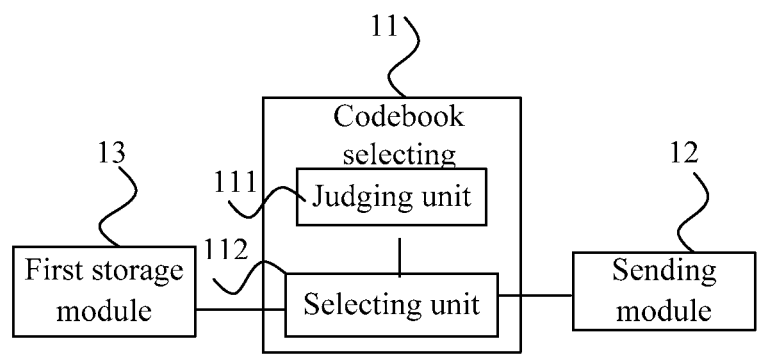
FIG. 8 is a schematic structural diagram of user equipment according to another embodiment of the present invention.

FIG. 8 is a schematic structural diagram of user equipment according to another embodiment of the present invention. As shown in FIG. 8, on the basis of the user equipment shown in FIG. 7, the user equipment in this embodiment further includes a first storage module 13. The first storage module 13 is configured to store the codebook set, where $N_t=8$, the spacing between the 8 antennas is a small spacing, and the codebook set includes K codebooks; the 8×1 codebook vector $$\begin{bmatrix} A \\ B \end{bmatrix}$$

corresponding to K/2 codebooks in the K codebooks respectively is obtained by using an 8-dimensional discrete Fourier transformation codebook structure, and the number of the discrete Fourier transformation groups is K/(2Nt); the codebook vector of the other K/2 codebooks in the K codebooks is $$\begin{bmatrix} A \\ -B \end{bmatrix},$$

where A is a vector composed of the first 4 elements in the 8×1 codebook vector, and B is a vector composed of the last 4 elements in the 8×1 codebook vector. Correspondingly, the codebook selecting module 11 is specifically configured to select a codebook vector for performing precoding processing for data among the codebook set stored by the first storage module. In this embodiment, the codebook selecting module 11 may include a judging unit 111 and a selecting unit 112. The judging unit 111 is configured to judge whether the configuration mode of the antenna is a dual polarization configuration mode or a uniform linear array configuration mode. The selecting unit 112 is configured to: select the codebook vector in the first codebook vector and the second codebook vector of the codebook set if the judging unit 111 determines that the configuration mode of the antenna is a dual polarization configuration mode; and select the codebook vector in the first codebook vector of the codebook set if the judging unit 111 determines that the configuration mode of the antenna is a uniform linear array configuration mode.

The UE in this embodiment may be used to implement the method in the method embodiment shown in FIG. 4, and the implementation principles are similar and will not be repeated here any further.

In this embodiment, the user equipment may select codebook vectors among the codebook set compatible with both the ULA configuration mode and the dual polarization configuration mode according to the configuration mode of the antenna. If the antenna is configured in a ULA mode, the user equipment may select codebook vectors among the first codebook set; if the antenna is configured in a dual polarization mode, the user equipment may select codebook vectors among the second codebook set. In this way, the index numbers corresponding to the codebook vectors may be sent to the base station so that the base station can use the codebook vectors corresponding to the index numbers to perform procoding processing for the data to be sent. Through the codebook set in the embodiments of the present invention, the largest possible number of codebook vectors are applicable to both the ULA antenna and the dual-polarized antennas, which provides high compatibility and avoids resource redundancy.

Figure 9:
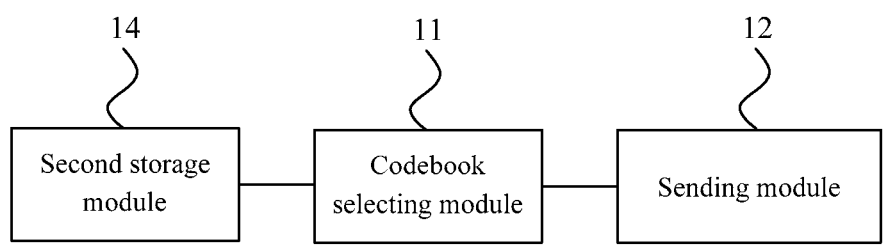
FIG. 9 is a schematic structural diagram of user equipment according to another embodiment of the present invention.

FIG. 9 is a schematic structural diagram of user equipment according to another embodiment of the present invention. As shown in FIG. 9, on the basis of the user equipment shown in FIG. 7, the user equipment in this embodiment further includes a second storage module 14. The second storage module 14 is configured to store the codebook set, where $N_t=8$, the 8 antennas are divided into two groups, the spacing between 4 antennas in each group is a small spacing, and the spacing between the two groups of antennas is a large spacing; the codebook set includes K codebooks, and the K codebooks include a first codebook vector $$\begin{bmatrix} A \\ B \end{bmatrix}$$

and a second codebook vector $$\begin{bmatrix} A \\ -B \end{bmatrix},$$

where A is a 4×1 vector obtained by using a 4-dimensional discrete Fourier transformation codebook structure and corresponding to one group of antennas, and B is a 4×1 vector obtained by using a 4-dimensional discrete Fourier transformation codebook structure and corresponding to the other group of antennas. Correspondingly, the codebook selecting module 11 is specifically configured to select a codebook vector for performing precoding processing for data among the codebook set stored by the second storage module 14.

The user equipment in this embodiment is applicable to the antenna layout shown in FIG. 5 or FIG. 6. In this embodiment, the UE need not differentiate the antenna configuration modes, the UE can select codebook vectors in the codebook set no matter whether the antenna configuration mode is the ULA configuration mode shown in FIG. 5 or the dual polarization configuration mode shown in FIG. 6, and therefore, the base station can use the codebook vectors to perform precoding processing for the data to be sent. Therefore, in this embodiment, the codebook set stored in the user equipment is highly compatible, thereby avoiding resource redundancy.

Correspondingly, in the codebook set of an embodiment of the present invention, the codebook set includes a first codebook vector $$\begin{bmatrix} A \\ B \end{bmatrix}$$

and a second codebook vector $$\begin{bmatrix} A \\ -B \end{bmatrix},$$

where the first codebook vector is a codebook vector of a uniform linear array, A is a $(N_t/2)\times1$ vector composed of a first half of elements of the first codebook vector, B is a $(N_t/2)\times1$ vector composed of a last half of elements of the first codebook vector, and $N_t$ is the number of antennas and is a positive even number. The codebook set is the codebook set applied in the method embodiment shown in FIG. 3. The functions and purposes of the codebook set are detailed in the method embodiment shown in FIG. 3 and will not be repeated here any further.

Further, to adapt to the antenna layout shown in FIG. 1 and FIG. 2, in which $N_t=8$ and the spacing between the 8 antennas is a small spacing, the codebook set includes K codebooks; wherein, the 8×1 codebook vector $$\begin{bmatrix} A \\ B \end{bmatrix}$$

corresponding to K/2 codebooks in the K codebooks respectively is obtained by using an 8-dimensional discrete Fourier transformation codebook structure, and the number of the discrete Fourier transformation groups is K/(2Nt); the codebook vector of the other K/2 codebooks in the K codebooks is $$\begin{bmatrix} A \\ -B \end{bmatrix},$$

where A is a vector composed of the first 4 elements in the 8×1 codebook vector, and B is a vector composed of the last 4 elements in the 8×1 codebook vector. The codebook set is the codebook set applied in the method embodiment shown in FIG. 4. The functions and purposes of the codebook set are detailed in the method embodiment shown in FIG. 4 and will not be repeated here any further.

Further, to adapt to the antenna layout shown in FIG. 5 and FIG. 6, $N_t=8$ and the 8 antennas are divided into two groups, the spacing between 4 antennas in each group is a small spacing, and the spacing between the two groups of antennas is a large spacing; the codebook set includes K codebooks, and the K codebooks include a first codebook vector $$\begin{bmatrix} A \\ B \end{bmatrix}$$

and a second codebook vector $$\begin{bmatrix} A \\ -B \end{bmatrix},$$

where A is a 4×1 vector obtained by using a 4-dimensional discrete Fourier transformation codebook structure and corresponding to one group of antennas, and B is a 4×1 vector obtained by using a 4-dimensional discrete Fourier transformation codebook structure and corresponding to the other group of antennas.

The codebook set in this embodiment is applicable to the antenna layout shown in FIG. 5 or FIG. 6. In this embodiment, the UE need not differentiate the antenna configuration modes, the UE can select codebook vectors in the codebook set no matter whether the antenna configuration mode is the ULA configuration mode shown in FIG. 5 or the dual polarization configuration mode shown in FIG. 6, and therefore, the base station can use the codebook vectors to perform precoding processing for the data to be sent. Therefore, in this embodiment, the codebook set stored in the user equipment is highly compatible, thereby avoiding resource redundancy.

Persons of ordinary skill in the art should understand that all or part of the steps of the method specified in any embodiment of the present invention may be implemented by a program instructing relevant hardware. The program may be stored in a computer readable storage medium. When the program runs, the program executes the steps of the method specified in any embodiment above. The storage medium may be any medium capable of storing program codes, such as ROM, RAM, magnetic disk, or CD-ROM.

Finally, it should be noted that the embodiments of the present invention are intended for describing the technical solution of the present invention other than limiting the present invention. Although the present invention is described in detail with reference to the foregoing embodiments, persons of ordinary skill in the art should understand that they can still make modifications to the technical solution described in the foregoing embodiments or make substitutions to some technical features thereof, without departing from the spirit and scope of the technical solution of the embodiments of the present invention.

What is claimed is:

1. A precoding processing method, comprising:
   selecting, by a user equipment (UE), a codebook vector for performing precoding processing for data among a codebook set of $N_t$ antennas, wherein the codebook set comprises a first codebook vector $$\begin{bmatrix} A \\ B \end{bmatrix}$$

and a second codebook vector $$\begin{bmatrix} A \\ -B \end{bmatrix}$$

generated according to the first codebook vector, A is a $(N_t/2) \times 1$ vector composed of a first half of elements of the first codebook vector, B is a $(N_t/2) \times 1$ vector composed of a last half of elements of the first codebook vector, and $N_t$ is a positive even number; and
sending, by the UE, an index number of the codebook vector to a base station;
wherein:
$N_t=8$, the codebook set comprises K codebooks where K is an integer, an 8×1 codebook vector $$\begin{bmatrix} A \\ B \end{bmatrix}$$

corresponding to K/2 codebooks in the K codebooks is respectively obtained by using an 8-dimensional discrete Fourier transformation codebook structure, and a number of discrete Fourier transformation groups is $K/(2N_t)$; the codebook vector of the other K/2 codebooks in the K codebooks is $$\begin{bmatrix} A \\ -B \end{bmatrix},$$

where A is a vector composed of first 4 elements in the 8×1 codebook vector, and B is a vector composed of last 4 elements in the 8×1 codebook vector; and
a codebook design of the first codebook vector $$\begin{bmatrix} A \\ B \end{bmatrix}$$

utilizes a discrete Fourier transformation codebook structure;
wherein the discrete Fourier transformation codebook structure is as follows:

$$e_m^{(g)} = \frac{1}{\sqrt{M}} \begin{bmatrix} w_{0m}^{(g)} & \cdots & w_{(M-1)m}^{(g)} \end{bmatrix}^T$$

$$w_{nm}^{(g)} = \exp\left\{j \frac{2\pi n}{M}\left(m + \frac{g}{G}\right)\right\}$$

where superscript T represents a transpose operation, M is a number of dimensions of discrete Fourier transformation and M=8, with m=0, 1 ... M−1 and n=0, 1 ... M−1, G is the number of discrete Fourier transformation groups, with g=0, 1, ..., G−1, and $e_m^{(g)}$ is a precoding vector in the codebook set, and $w_{nm}^{(g)}$ represents elements in $e_m^{(g)}$.

2. The precoding processing method according to claim 1, wherein:
the selecting, by the UE, the codebook vector for performing precoding processing for the data among the codebook set of $N_t$ antennas comprises at least one of:
selecting, by the UE, the codebook vector in the first codebook vector and the second codebook vector of the codebook set if a configuration mode of the antennas is a dual polarization configuration mode; and
selecting, by the UE, the codebook vector in the first codebook vector of the codebook set if the configuration mode of the antennas is a uniform linear array configuration mode.

3. The precoding processing method according to claim 1, wherein:
the selecting, by the UE, the codebook vector for performing precoding processing for the data among the codebook set of $N_t$ antennas comprises at least one of:
selecting, by the UE, the codebook vector in the first codebook vector and the second codebook vector of the codebook set if a configuration mode of the antennas is a dual polarization configuration mode; and
selecting, by the UE, the codebook vector in the first codebook vector of the codebook set if the configuration mode of the antennas is a uniform linear array configuration mode.

4. A user equipment, comprising:
a codebook selecting module, configured to select a codebook vector for performing precoding processing for data among a codebook set of $N_t$ antennas, wherein the codebook set comprises a first codebook vector $$\begin{bmatrix} A \\ B \end{bmatrix}$$

and a second codebook vector $$\begin{bmatrix} A \\ -B \end{bmatrix}$$

generated according to the first codebook vector, and A is a $(N_t/2) \times 1$ vector composed of a first half of elements of the first codebook vector, B is a $(N_t/2) \times 1$ vector composed of a last half of elements of the first codebook vector, and $N_t$ is a positive even number;
a transmitter, configured to send an index number of the codebook vector selected by the codebook selecting module to a base station; and
a first storage module, configured to store the codebook set, wherein $N_t=8$, and the codebook set comprises K codebooks where K is an integer;
wherein an 8×1 codebook vector $$\begin{bmatrix} A \\ B \end{bmatrix}$$

corresponding to K/2 codebooks in the K codebooks is respectively obtained by using an 8-dimensional discrete Fourier transformation codebook structure, a number of discrete Fourier transformation groups is $K/(2N_t)$, and a codebook vector of the other K/2 codebooks in the K codebooks is $$\begin{bmatrix} A \\ -B \end{bmatrix};$$

wherein A is a vector composed of first 4 elements in the 8×1 codebook vector, and B is a vector composed of last 4 elements in the 8×1 codebook vector; and
wherein the codebook selecting module is configured to select a codebook vector for performing precoding processing for data among the codebook set stored by the first storage module;
wherein the codebook design of the first codebook vector $$\begin{bmatrix} A \\ B \end{bmatrix}$$

utilizes a discrete Fourier transformation codebook structure; and
wherein the discrete Fourier transformation codebook structure is as follows:

$$e_m^{(g)} = \frac{1}{\sqrt{M}} \begin{bmatrix} w_{0m}^{(g)} & \cdots & w_{(M-1)m}^{(g)} \end{bmatrix}^T$$

$$w_{nm}^{(g)} = \exp\left\{j \frac{2\pi n}{M}\left(m + \frac{g}{G}\right)\right\}$$

where superscript T represents a transpose operation, M is a number of dimensions of discrete Fourier transformation, M=8, with m=0, 1 ... M−1 and n=0, 1 ... M−1, G is the number of discrete Fourier transformation groups, with q=0, 1, ..., G−1. $e_m^{(g)}$ is a Precoding Vector in the Codebook Set, and $w_{nm}^{(g)}$ Represents elements in $e_m^{(g)}$.

5. The user equipment according to claim 4, wherein the codebook selecting module comprises:
a judging unit, configured to judge whether a configuration mode of the antenna is a dual polarization configuration mode or a uniform linear array configuration mode; and
a selecting unit, configured to: select the codebook vector in the first codebook vector and the second codebook vector of the codebook set if the judging unit determines that the configuration mode of the antenna is a dual polarization configuration mode; and select the codebook vector in the first codebook vector of the codebook set if the judging unit determines that the configuration mode of the antenna is a uniform linear array configuration mode.

6. The user equipment according to claim 4, wherein the codebook selecting module comprises:
a judging unit, configured to judge whether a configuration mode of the antenna is a dual polarization configuration mode or a uniform linear array configuration mode; and
a selecting unit, configured to: select the codebook vector in the first codebook vector and the second codebook vector of the codebook set if the judging unit determines that the configuration mode of the antenna is a dual polarization configuration mode; and select the codebook vector in the first codebook vector of the codebook set if the judging unit determines that the configuration mode of the antenna is a uniform linear array configuration mode.

* * * * *

UNITED STATES PATENT AND TRADEMARK OFFICE
CERTIFICATE OF CORRECTION

PATENT NO.       : 8,903,004 B2
APPLICATION NO.  : 13/668747
DATED            : December 2, 2014
INVENTOR(S)      : Zhou et al.

Page 1 of 1

It is certified that error appears in the above-identified patent and that said Letters Patent is hereby corrected as shown below:

*In the Claims*

Claim 4, Column 18, line 36-37:

"with q = 0, 1, ... , G-1. $\mathbf{e}_m^{(g)}$ is a Precoding Vector in the Codebook Set, and $w_{nm}^{(g)}$ Represents elements in $\mathbf{e}_m^{(g)}$." should read "with g = 0, 1, ... , G-1. $\mathbf{e}_m^{(g)}$ is a precoding vector in the codebook set, and $w_{nm}^{(g)}$ represents elements in $\mathbf{e}_m^{(g)}$."

Signed and Sealed this
Tenth Day of November, 2015

Michelle K. Lee
*Director of the United States Patent and Trademark Office*